United States Patent [19]

Amer

[11] 4,307,125

[45] Dec. 22, 1981

[54] LOW FAT BUTTER-LIKE SPREAD

[75] Inventor: Victor Amer, Guelph, Canada

[73] Assignee: Gay-Lea Foods Co-Operative Limited, Weston, Canada

[21] Appl. No.: 107,344

[22] Filed: Dec. 26, 1979

[51] Int. Cl.³ .............................................. A23D 3/00
[52] U.S. Cl. ................................... 426/604; 426/586
[58] Field of Search ............... 426/601, 602, 603, 604, 426/586

[56] References Cited

U.S. PATENT DOCUMENTS

| | | | |
|---|---|---|---|
| 3,266,904 | 8/1966 | Duin et al. | 426/604 |
| 3,360,378 | 12/1967 | Spitzer et al. | 426/604 |
| 3,946,122 | 3/1976 | Scharp | 426/604 |
| 3,962,464 | 6/1976 | Sozzi | 426/603 X |
| 4,000,332 | 12/1976 | Strinning et al. | 426/603 |
| 4,071,634 | 1/1978 | Wilton et al. | 426/604 |

FOREIGN PATENT DOCUMENTS

| | | | |
|---|---|---|---|
| 284950 | 8/1968 | Australia | 426/602 |
| 372051 | 2/1938 | Canada . | |
| 718860 | 9/1965 | Canada . | |
| 783528 | 4/1968 | Canada . | |
| 794793 | 9/1968 | Canada . | |
| 800961 | 12/1968 | Canada . | |
| 913454 | 10/1972 | Canada . | |
| 1094268 | 12/1967 | United Kingdom . | |

*Primary Examiner*—Robert A. Yoncoskie
*Attorney, Agent, or Firm*—Leon Arthurs; Kenneth M. Garrett

[57] ABSTRACT

Low fat butter having good low temperature spreadability and an enhanced protein to fat ratio in comparison to natural butter is prepared from cream in a one step process wherein a small percentage of an emulsifier and a hydrocolloid are incorporated into the cream, and the resulting blend is chilled and worked in a swept surface heat exchanger whereby phase inversion without syneresis occurs. The blend is preferably homogenized and pasteurized prior to phase inversion, whereby the stability and keepability of the resulting product is improved.

25 Claims, 1 Drawing Figure

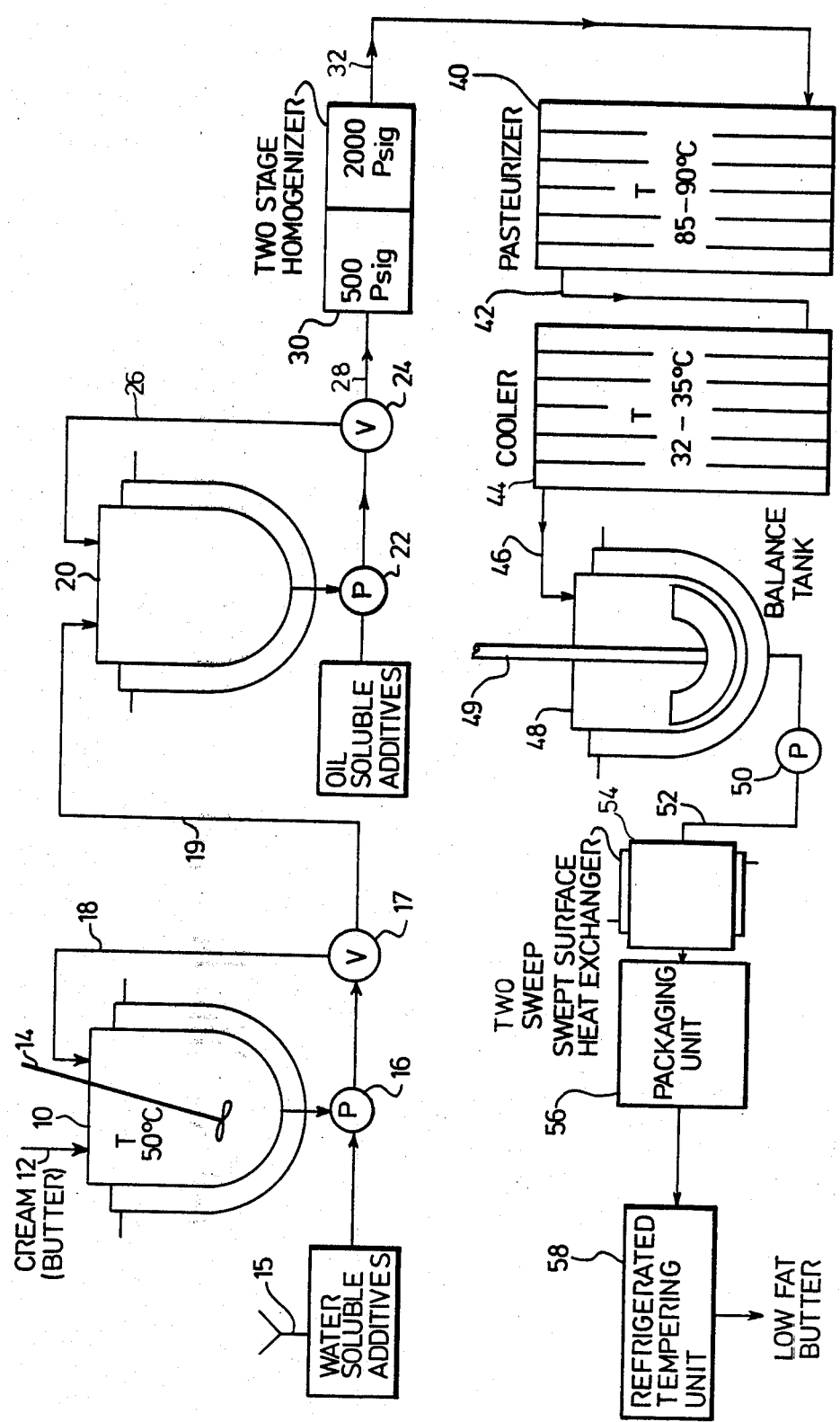

LOW FAT BUTTER-LIKE SPREAD

FIELD OF INVENTION

My invention relates to butter having a low fat content, and a process for the production thereof.

BACKGROUND OF INVENTION

Milk fats contain a relatively high proportion of glycerides of saturated fatty acids. Such glycerides have relatively high softening temperatures; as the temperature of the butter is decreased by refrigeration, for example, the hardness of the butter increases greatly whereby it becomes no longer spreadable. It would be highly desirable to decrease the concentration of these fatty acids in butter so that the butter is spreadable at lower temperatures, particularly where this can be achieved whilst retaining the plastic characteristics of butter at normal ambient temperatures. It would be further desirable to achieve this decrease in the concentration of saturated fatty acids as these are considered by many authorities to be linked to blood cholesterol formation.

The rheological properties of margerin have long been known to be influenced by varying the fatty acid make-up of the glycerides and also the water content of the emulsion. Whilst it would be possible to modify the chemical make-up of butter fat, e.g. by transesterification, such product would no longer be a true dairy product.

It has heretofore been proposed to reduce the fat content of butter by increasing the water content thereof. In such proposals butter is first prepared from cream by churning in the traditional manner, and water is reincorporated as a second step. It would be economically desirable to produce a low fat product from cream in a one step process.

Furthermore, the churning process for the manufacture of normal butter is essentially a batch process. It would be desirable to produce butter from cream as a continuous process.

Natural butter comprises a water in oil emulsion of about 80% milk fats, 17% water, 1% to 2% milk solids not fat (milk solids) and up to about 2% salt; minor quantities of other adjuvants may also be present. It is generally produced by churning dairy cream having up to about 40% milk fat, 6% milk solids, with the balance water. In the churning process a phase inversion occurs when the separation of buttermilk from the butter produced, and a concomitent increase in fat content and decrease in milk solids. Since the milk solids are predominately protein it is apparent that there is a loss of nutritional value in the formation of natural butter from cream. It would be desirable to produce a low fat butter having the nutritional balance in terms of protein to fat ratio about equal to that of dairy cream.

It is known to produce low fat dairy spreads directly from cream. However, in such processes the product is an oil in water emulsion. The continuous aqueous phase with its relatively high protein content forms an excellent medium for the propagation of micro-organisms, and such products have little commercial acceptance for this reason. Even where the aqueous phase is discontinuous, it may still be conducive to bacterial propagation, particularly where the protein of the product is relatively high as herein. It would be desirable to provide a nutritional, low fat butter of good keeping quality.

OBJECTS OF THE INVENTION

In accordance with the prime aspect of this invention there is provided low fat butter having good low temperature spreadability.

In a further aspect of the invention there is provided a low fat butter of enhanced nutritional value.

In yet a further aspect of the invention there is provided a low fat butter having an enhanced nutritional value and good keeping qualities.

In another aspect of this invention, there is provided a simple, one step process for the production of low fat butter from cream.

SUMMARY OF INVENTION

In accordance with one embodiment of the invention, a low fat butter is produced from a dairy cream by incorporating into such dairy cream a relatively small quantity of a non-ionic emulsifying agent having a hydrophilic-lipophilic balance (HLB) as defined in BECHER, EMULSIONS THEORY AND PRACTICE, ACS MONOGRAM 135, 1957, in the range of about 3 to 5 inclusive, and a relatively small quantity of a hydrocolloid. The cream is subject to homogenizing conditions so as to produce a relatively fine emulsion, following which it is chilled and worked whereby phase inversion takes place without any substantial syneresis occuring. The resulting product is then tempered by refrigeration, so as to induce a gel structure therein.

The cream will generally have a milk fat content equal to that of the low fat butter to be prepared, and in the range of about 35% to about 60% by weight, there being no criticality in respect thereof. Preferably the cream will contain about 40% by weight milk fat. Cream of this milk fat content may be readily separated from whole milk by low speed centrifuging, for example. Cream of higher milk fat content may be separated from whole milk by higher speed centrifuging. In addition, a natural cream may be modified to supplement the milk fat of such natural cream by other fatty materials. Preferably such fatty materials will be dairy products such as butter or butter fat; it is also contemplated that fats from non dairy sources, for example vegetable oils, be employed to supplement the milk fat. In general the amount of fat used to modify the cream so as to supplement the milk fat will not comprise more than about 50% by weight of the total fats of the modified cream.

Natural cream containing about 35% about 60% by weight milk fat will normally contain therein about 4% to about 8% by weight of milk protein. When cream is modified by the addition of other fatty materials in the manner indicated above, such modified cream will have a reduced protein content in comparison to the natural cream of an equivalent fat content. It is found necessary to increase the concentration of hydrocolloid as the protein content decreases so as to produce a product of a given firmness and spreadability. Preferably the protein content of modified cream is adjusted by the addition of milk or milk powder so as to be not less than about 4% by weight of the finished product. Generally the protein content is maintained in the range of about 4% to about 6% be weight so as to strike a balance between the nutritional value and taste of the finished product and the amount of added hydrocolloid.

The non-ionic emulsifier is preferably of the glyceryl ester type; particularly preferred are those esters of the long chain, saturated fatty acids such as stearic acid and palmitic acid. Such esters have a higher setting point than those of the corresponding unsaturated esters, and this is found to be conducive to forming liquid crystaline phases (gels) in water at a somewhat higher temperature than that for the unsaturated type. This ability enables them to be used effectively as water binding, firming and plasticizing agents. The non-ionic emulsifier should have a HLB value in the range of about 3 to 5 inclusive. Preferably the HLB value should be about 3. A preferred emulsifier having the requisite value is distilled glyceryl monostearate having a concentration of the mono ester of at least about 90% with the balance being substantially a di ester. A suitable commercial product of this type is sold under the trade mark DI-MONDAN S.

The quantity of the emulsifier will depend to some extent upon the type of emulsifier used and the level of naturally occuring emulsifier present in the cream such as the phospholipids. Generally, when using the preferred emulsifier the concentration thereof will be within about 0.5% to about 1.5% by weight, based on the total weight of the ingredients; preferable when the milk fat content is about 40% by weight the concentration of the emulsifier will be about 0.9%. Where the milk fat is replaced by blending the cream with other fatty materials as disclosed above, the concentration of phospholipids will generally be decreased, and the concentration of added emulsifier should be proportionately increased so as to produce a product of comparable stability and firmness.

The hydrocolloids for use in the present invention function as a firming agent for the low fat butter and increases the stability of the water in oil emulsion. Suitable hydrocolloids are for example derivatives of alginic acid, gelatin and sodium caseinate. Most preferred is sodium alginate, as this has enabled a more firm product to be produced, in relation to the quantity of hydrocolloid employed, than that which results from other hydrocolloids which have so far been employed. From this it will be apparent that the concentration of hydrocolloid to be employed will depend to some extent upon the desired firmness of the low fat butter, and generally the concentration will be in the range of about 0.3% to about 1.5% by weight, based upon the total weight of the starting ingredients, where sodium alginate is employed, the other hydrocolloids being utilizable in an amount to give an equivalent desired effect.

The sequence of addition of the hydrocolloid and emulsifying agent has not been found to be critical. Such additions should be controlled so as to reduce the caking of the additives and to avoid calcium reaction. Calcium reaction is minimized by the use of sequestering agents and peptizing agents such as sodium tetrapyrophosphate and sodium citrate. It is found that the gel strength of the resulting product is improved by the incorporation of the sequestering agent. About 0.1% by weight of each of these additives, based on the total weight of ingredients, is adequate for the present purposes.

It is found that the method of preparing the product of the invention has a significant bearing upon the properties of the finished product, and also interrelates to some extent with the concentration of emulsifier and hydrocolloid necessary to yield a product of desirable characteristics. The preferred method of preparation of the low fat butter is described in conjunction with the drawings appended hereto, which shows a flow diagram of such method operated in a continuous manner.

DESCRIPTION OF PREFERRED EMBODIMENT

In the drawing, the numeral 10 represents a steam jacketed tank which is charged through a line 12 with cream. Such cream may have a milk fat content equal to that of the desired low fat butter, or the milk fat content may be supplemented by the addition of butter in which case tank 10 is desirably equipped with an agitator 14. The temperature of tank 10 is such to render the milk fat liquid, and will normally be maintained at about 50° C. The "water soluble" additives such as the hydrocolloid, the sequestering agent, together with an antifungicide such as potassium sorbate, salt, and water soluble butter flavour where desired are added to the cream by an in line funnel arrangement 15 when dry blended therewith, at circulating pump 16. Alternatively these additives may be dissolved in milk or water to form a paste or solution prior to addition to the cream if desired, such alternative method further tending to reduce calcium reaction. The outlet from pump 16 is in part recirculated to tank 10 through valve 17 and line 18, and part is transferred to steam jacketed tank 20. Here the temperature is further increased to about 70° C. At this temperature the glyceryl monostearate emulsifier is molten, and is readily incorporated into the cream by metering in at pump 22. Other oil soluble additives such as carotene, butter flavour and colourant may be incorporated at this stage, serving additionally to mollify and dissolve the emulsifier. The output from pump 22 is in part recirculated to tank 20 through valve 24 and line 26, and in part transferred through line 28 to a two stage homogenizer 30. The blended cream at about 70° C. is subject to homogenization at an initial pressure of 500 PSIG and a final pressure of about 2000 PSIG. Homogenization if found to have an important effect in retarding microbial growth in the finished product, both by decreasing the size of the water droplets (to about 2 to 3 microns), and also by enhancing the protein absorption of the fat particles (and correspondingly reducing the concentration of protein in the aqueous phase). It is further found that the reduced particle size increases the ease of the later phase inversion step and lessens the tendency of phase separation which might otherwise occur in such step.

It will be apparent that the homogenization step will assist in incorporating the various additives in the cream. However, if desired such step may take place prior to blending of the additives although this sequence is less preferred.

The outlet from homogenizer 30 is transferred through line 32 to multiplate pasteurizer 40 where the homogenized cream is subject to a temperature of about 93° C. to 95° C. for a short time pasteurization so as to reduce any microbioal activity. Standard plate counts of the fresh finished product generally range from less than 100 to not more than 1000 per gram of product. It is generally undesirable to maintain the admixed cream at the above temperatures, particularly where it is desired that the finished product be printable, as it is found that such heating weakens the gel strength of the butter. It is surmised that this may be due to the depolymerization of the hydrocolloid, although this is by no means certain. A residence time of some 30 seconds is found to be adequate for the purpose of pasteurization.

The output from pasteurizer 40 is passed via line 42 to plate cooler 44 where the temperature is rapidly reduced to about 32° C. to 35° C., and thence via line 46 to a cold jacketed balance tank 48. Balance tank 48 is equipped with a slowly rotating paddle 49 so as to promote further cooling and initiate the solidification of milk fat whilst avoiding syneresis.

The output from balance tank 48 is transferred by pump 50 and line 52 to a continuous throughput two sweep surface heat exchanger arrangement 54 such as a Votator ™ unit. Here the cooled mixture is rapidly chilled to a temperature in the range of about 9° C. to about 12° C., and the chilled mixture is mechanically worked, thereby inducing phase inversion but without any appreciable accompanying syneresis. The resulting plastic, water in-oil emulsion is then normally packaged, preferably in tubs, at packaging unit 56 following which it is refrigerated at 2° C. to 4° C. at refrigeration unit 58 for about 36 hours to complete the gel formation and temper the product. If desired, for example when the low fat butter has a well defined solid form that may be wrapped, the refrigerating and packaging stations may be reversed in sequence.

It is found that the low fat butter produced in accordance with the above process has excellent keeping properties. Thus such coliform, mould and yeast organisms as may be present in the finished product in accordance with the above defined range showed little or no growth over an extended period, and a shelf life of some three months for the product is entirely feasible. Where long keeping quality is not a problem, lower pasteurization temperatures may be used or the step may be omitted.

In the above illustrated embodiment the blending stage of the process is shown as being operated in a continuous manner. It may, of course be operated batchwise, in which case tank 20 may be omitted and the output from line 19 connected directly to homogenizer 30. The temperature of the cream in tank 10 is raised from ambient to about 70° C. and the various additives incorporated by metering through pump 16 at appropriate temperatures.

The following examples, in which the parts are by weight further illustrate the invention;

EXAMPLE 1

97 parts of a natural cream containing 40% milk fats and 8% milk with solids comprising about 65% milk protein is heated to about 50° C. to render the solid milk fat content liquid; a dry mixture consisting of 0.5 parts sodium alginate, 0.1 parts each of sodium tetrapyrophosphate, sodium citrate and potassium sorbate, together with 1.2 parts of butter salt is admixed with the heated cream in an in-line funnel arrangement. The temperature of the admixture is raised to about 70° C., when 0.9 parts of Dimondan S distilled monoglycerides is incorporated together with minor amounts of oil soluble colourant and flavouring. The hot cream is then homogenized in a two stage homogenizer wherein the second valve is set at 500 PSIG and the first valve at about 2000 PSIG, thereby forming a emulsion having a particle size about 2–3 microns. The homogenized cream is pasteurized for about 30 seconds at a temperature of 95° C., following which it is cooled to 35° C. in a plate cooler, avoiding vigorous mechanical agitation. The cooled mixture is slowly stirred to initiate crystallization of the solid milk fats whilst avoiding syneresis. The cooled mixture is passed into a two sweep surface heat exchanger, operating at about 10° C., wherein phase inversion took place with no syneresis. The resulting product is packaged in tubs and tempered for 36 hours at about 2°–4° C. The tempered product has average penetrometer readings as shown in Table 1.

TABLE 1

COMPARISON OF PENETROMETER VALUES FOR LOW FAT BUTTER OF EXAMPLE 1 and NORMAL BUTTER

| Sample | Penetrometer Values $10^{-1}$ mm. at | | |
|---|---|---|---|
| | 2° C. | 10° C. | 13° C. |
| Normal Butter | 27 | 45 | 69 |
| Low Fat Butter | 149 | 183 | 200 |

From the above it may be seen that the spreadability of the low fat butter of the instant invention is much greater than that of natural butter, and it will be appreciated from these values that the low fat butter is easily spreadable even at very low refrigeration temperatures. Additionally, the percentage change in the spreadability of the low fat butter is relatively small over the range of temperature normally encountered in domestic refrigerators.

EXAMPLES 2–3

The procedure of Example 1 is repeated, whilst varying the milk solids level of the cream by the addition of milk powder. The protein concentration of the cream is taken as being about 65% that of the milk solids. The amount of sodium alginate necessary to achieve a product having penetrometer values approximately in accordance with those given in Example 1 is shown in Table 2 below, with Example 1 being shown as a control.

TABLE 2

MILK PROTEIN - HYDROCOLLOID RELATIONSHIP

| Example | Control | 2 | 3 |
|---|---|---|---|
| Protein content of cream % | 3.9 | 5.2 | 6.5 |
| % sodium alginate additive | 0.70 | 0.50 | 0.40 |

EXAMPLES 4–7

The procedure of Example 1 is followed but using natural cream of different milk fat content and maintaining the milk solids with the range of about 8–10%. The quantity of emulsifying agent (Dimondan S) necessary to achieve penetrometer values for the low fat butter approximately in accordance with those given in Example 1 (Control) is shown in Table 3 below:

TABLE 3

MILK FAT - EMULSIFIER RELATIONSHIP

| Example | Control | 4 | 5 | 6 | 7 |
|---|---|---|---|---|---|
| Milk Fat % | 40 | 35 | 45 | 50 | 55 |
| Emulsifying Agent % | 0.90 | 1.00 | 0.85 | 0.75 | 0.60 |

It will be appreciated that many changes from the above description as come within known or customary practice in the art may be made without departing from the principles of the invention, the essential features of which are set forth in the appended claims.

I claim:
1. A process for producing a water in oil emulsion low fat butter-like spread comprising
(a) providing a natural dairy cream having a fat content in the range of about 35% to about 60% by weight, said fat consisting essentially of milk fats;

(b) incorporating into said cream an emulsifying amount of a non-ionic emulsifying agent having a hydrophilic to lipophilic balance in the range of about 3 to 5 inclusive, and minor stabilizing quantity of a hydrocolloid;

(c) subjecting said cream to homogenizing conditions to produce an homogenized cream; then (d) chilling and working the homogenized cream whereby a phase inversion to said water in oil emulsion takes place without any substantial separation of buttermilk.

2. The process as described in claim 1 wherein said cream is subject to homogenizing conditions subsequent to the incorporation of said emulsifying agent and said hydrocolloid therein.

3. The process as described in claim 1 wherein said cream is heated to a temperature of not less than about 50° C. so as to melt solid fats, and incorporating said hydrocolloid into said heated cream.

4. The process as described in claim 1 wherein said cream is heated to a temperature of not less than about 70° C., and incorporating said non-ionic emulsifying agent into said heated cream.

5. The process as described in claim 1 wherein said cream is subject to said homogenizing conditions at a temperature of about 70° C.

6. The process as described in claim 5 wherein said homogenizing conditions comprise a two stage homogenizer operating at pressure of about 500 PSIG at the first stage thereof and a pressure of about 2000 PSIG at the second stage thereof.

7. The process of claim 1, wherein said cream is pasteurized in a short residence time pasteurizer prior to said chilling step.

8. The process of claim 7 wherein said cream is pasteurized at a temperature of about 93° C. to 95° C. for at least about 30 seconds.

9. The process of claim 1 wherein said chilling and working is carried out continuously in a swept surface heat exchanger.

10. The process of claim 9 wherein said working is carried out at a temperature of about 9° C. to about 12° C.

11. The process of claim 1, 2 or 3 wherein said non-ionic emulsifying agent is a distilled monoglyceride ester of a saturated long chain fatty acid.

12. The process of claim 1, 2 or 3 wherein said hydrocolloid is sodium alginate.

13. The process of claim 1, 2 or 3 which includes the incorporation into said cream of a sequestering agent.

14. The process of claim 1, 2 or 3 which includes the incorporation into said cream of a fungicidal agent.

15. The process of claim 1, 2 or 3 wherein said cream contains about 42% milk fat and about 4% to about 6% protein.

16. The process of claim 1, 2 or 3 including tempering the chilled, worked product.

17. A low fat butter-like spread comprising a water in oil emulsion spreadable at refrigerator temperatures consisting essentially of about 40% by weight milk fat, 4% to 6% by weight milk protein, 1% distilled mono glycerides of a higher saturated fatty acid, 0.5% sodium alginate, 0.1% sodium tetrapyrophosphate, 0.1% sodium citrate, 0.1% sodium sorbate with the balance being water when prepared by the process of claim 12.

18. A low fat butter-like spread comprising a water in oil emulsion which is spreadable at refrigerator temperatures, comprising:

(a) about 35% to about 60% by weight of fat consisting essentially of milk fat;

(b) about 0.5% to about 1.5% by weight of at least one non-ionic emulsifier having a hydrophilic-lipophilic balance between about 3 to 5 inclusive;

(c) about 0.3% to about 1.5% by weight of a hydrocolloid;

(d) not less than about 4% by weight of milk protein;

(e) about 35% to about 60% by weight of water when prepared by the process of claim 1.

19. The low fat butter-like spread of claim 18 wherein said fat comprises about 40% by weight of said composition.

20. The low fat butter-like spread of claim 18 wherein said non-ionic emulsifier is a glyceryl ester of a saturated long chain fatty acid containing not less than about 90% by weight of a mono glyceride.

21. The low fat butter-like spread of claim 20 wherein said non-ionic emulsifier is glyceryl monostearate.

22. The low fat butter-like spread of claim 18 or 19 wherein said hydrocolloid is sodium alginate.

23. The low fat butter-like spread of claim 18 or 19 further comprising a sequestering quantity of a sequestering agent.

24. The low fat butter-like spread of claim 18 or 19 further comprising sodium tetraphyrophosphate and sodium citrate.

25. The low fat butter-like spread of claim 18 or 19 wherein said water comprises about 40% to 50% by weight.

* * * * *